United States Patent
Duggan et al.

(10) Patent No.: US 6,709,114 B1
(45) Date of Patent: Mar. 23, 2004

(54) SPHERICAL MOUNTING SYSTEM FOR THREE AXIS ADJUSTMENT OF LIGHT PROJECTOR ASSEMBLY IN A PROJECTION TELEVISION

(75) Inventors: Scott Joseph Duggan, Indianapolis, IN (US); Darin Bradley Ritter, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 452 days.

(21) Appl. No.: 09/598,662

(22) Filed: Jun. 21, 2000

Related U.S. Application Data
(60) Provisional application No. 60/178,329, filed on Jan. 27, 2000.

(51) Int. Cl.[7] .................. G03B 21/22; G03B 21/26; G03B 21/14; G02B 26/08; F21V 15/00
(52) U.S. Cl. .................. 353/74; 353/37; 353/47; 353/71; 353/72; 353/79; 353/87; 353/119; 359/198; 362/257; 362/362; 362/370; 362/382; 362/457; 348/739; 348/843; 248/121; 248/201; 248/205.1
(58) Field of Search .................. 353/74, 37, 47, 353/71–72, 79, 87, 119, 44, 122; 359/198, 196; 362/257, 362, 365, 370, 382, 457, 368, 409, 458; 348/739, 836, 842–843, 745, 789, 794, 798, 744; 248/121, 200–201, 205.1, 24

(56) References Cited

U.S. PATENT DOCUMENTS

| | | | |
|---|---|---|---|
| 4,058,837 A | 11/1977 | Muntz | 348/782 |
| 4,177,484 A | 12/1979 | Boje | 348/789 |
| 4,358,792 A | 11/1982 | Domoleczny et al. | 348/789 |
| 4,498,734 A | 2/1985 | Mihalakis et al. | 359/451 |
| 4,556,913 A * | 12/1985 | VanBreemen et al. | 348/782 |
| 4,711,535 A | 12/1987 | Shafer | 359/731 |
| 5,045,930 A | 9/1991 | Hasegawa | 348/748 |
| 5,113,320 A * | 5/1992 | Haydu | 362/549 |
| 5,289,287 A | 2/1994 | Dargis et al. | 348/766 |
| 5,585,867 A | 12/1996 | Ooya | 348/781 |
| 5,764,312 A | 6/1998 | Okumura | 348/785 |
| 5,796,443 A | 8/1998 | Kawajiri et al. | 348/839 |
| 5,796,446 A | 8/1998 | Marcellin-Dibon | 348/744 |
| 5,808,704 A | 9/1998 | Yoshikawa et al. | 348/748 |
| 6,157,416 A * | 12/2000 | Whitelaw et al. | 348/789 |

* cited by examiner

*Primary Examiner*—Russell Adams
*Assistant Examiner*—Magda Cruz
(74) *Attorney, Agent, or Firm*—Joseph S. Tripoli; Harvey D. Fried; Joseph J. Kolodka

(57) ABSTRACT

A mounting system for three axis rotational adjustment of a light projector assembly of a projection television, the mounting system having a spherical wall and a spherical bracket slidably engaged with the spherical wall and moveable relative thereto. The wall and bracket coact with one another to rotate the light projector assembly about three axes, thereby restricting movement of the projector assembly to a portion of a spherical path and enabling adjustment of an image generated by the projector assembly on a screen of a projection television to a desired geometry without affecting picture centering.

12 Claims, 4 Drawing Sheets

SPHERICAL MOUNTING SYSTEM FOR THREE AXIS ADJUSTMENT OF LIGHT PROJECTOR ASSEMBLY IN A PROJECTION TELEVISION

This application claims the benefit of U.S. Provisional Application Ser. No. 60/178,329, filed Jan. 27, 2000, entitled "Spherical Mounting Detail For Adjusting Three Axis of Rotation Without Affecting Centering".

BACKGROUND OF THE INVENTION

The present invention relates to projection televisions, and more particularly, to a spherical mounting system for three axis rotational adjustment of a light projector assembly in a projection television without affecting centering of the TV image on the screen of the television.

A conventional projection television (TV) typically consists of a plurality of critical optical components mounted in a multi-part cabinet structure. The optical components commonly include a light projector assembly for generating television images, a screen for viewing the images, and a large mirror (often combined with a smaller mirror) for directing the images generated by the light projector assembly to the screen.

Many projection TVs, such as Liquid-Crystal-On-Silicone (LCOS) projection TVs, do not have the ability to electrically correct geometry errors without causing other problems. Therefore, it is imperative that the mechanical aiming of the light projector assembly be adjusted to correct geometry errors. This is typically accomplished by rotationally adjusting the light projector assembly about its X, Y, and Z axes (three axis rotation).

Most conventional methods for three axis rotational adjustment of light projector assemblies involve the use of three or four separate components. In these methods, adjusting any one axis can affect picture centering. Accordingly, a method is needed for rotationally adjusting a light projector assembly of a projection TV in three axes to correct geometry errors, while maintaining the projector assembly's aim at the virtual center of the TV's screen.

SUMMARY OF THE INVENTION

The invention is directed to a mounting system for three axis rotational adjustment of a light projector assembly of a projection television. The mounting system comprises first and second spherical means which coact with one another to restrict movement of the projector assembly to a portion of a spherical path.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily to scale.

DETAILED DESCRIPTION OF THE INVENTION

Figure 1:
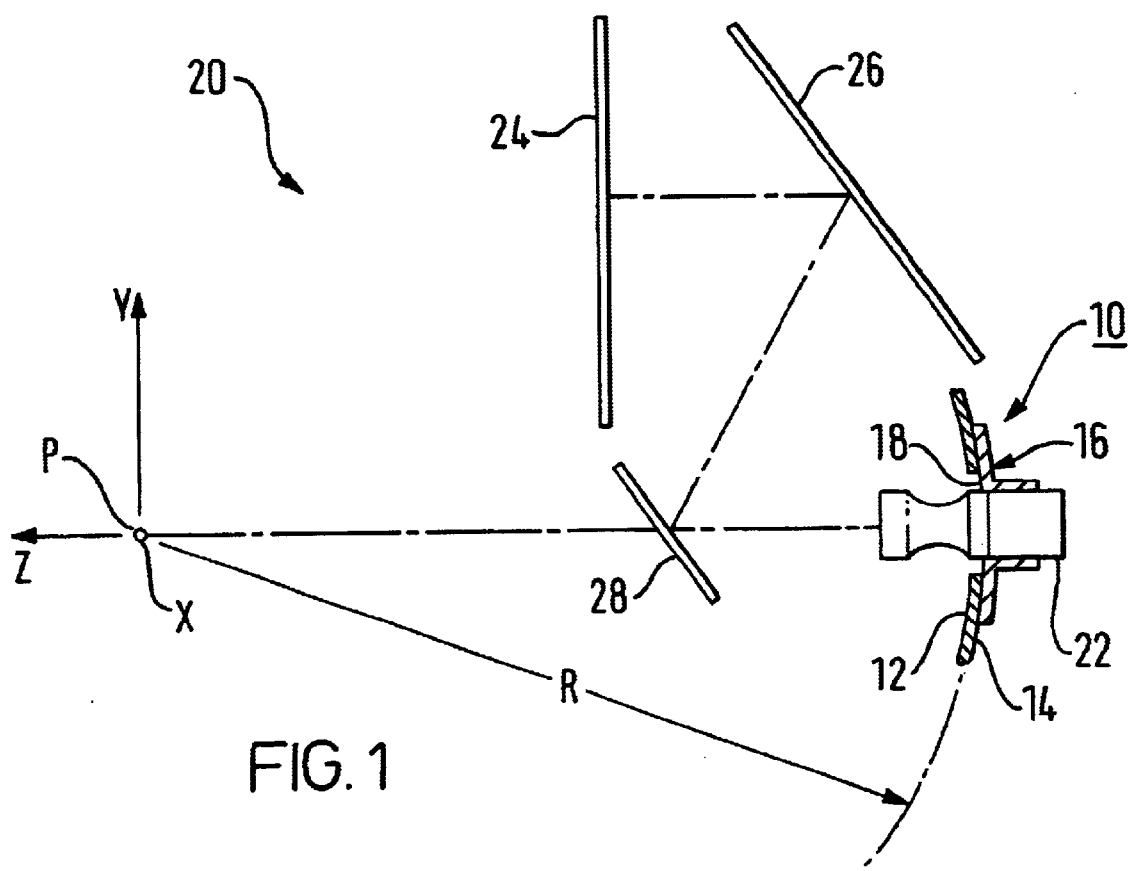
FIG. 1 is a schematic illustration of a spherical mounting system of the invention.

FIG. 1 illustrates a spherical mounting system 10 according to the invention, for three axis rotational adjustment of a light projector assembly 22 of a projection TV 20. The projection TV also includes a screen 24 for viewing images generated by the light projector assembly 22, and an upper mirror 26 and a lower mirror 28 for directing the images generated by the light projector assembly 24 to the screen 24.

The spherical mounting system 10 of the invention comprises a first part 12 having a convex spherical engagement surface 14 and a second part 16 having a concave spherical engagement surface 18 which slidably engages the convex spherical surface 14 of the first part 12. The interface of the convex and concave spherical engagement surfaces 14, 18 has a radius R measured from a center P of an imaginary sphere formed by continuing the spherical interface. The spherical mounting system 10 focuses the light projector assembly 22, which is attached to the second part, at the point P which is also equivalent to the center of a screen 24 of the projection TV 20. Thus, point P is referred to as the virtual center of the screen 24. The first part 12 typically comprises a fixed, non-moveable wall element (spherical wall 12) while the second part 16 typically comprises a freely moveable bracket element (spherical bracket 16) that attaches the light projector assembly to the mounting system 10. The spherical bracket 16 can be slidably moved relative to the non-moveable spherical wall 12 while maintaining intimate contact therewith. The spherical mounting system 10 permits rotation of the light projector assembly 22 about the virtual center P of the screen 24 in three axes: X (projecting out from the plane of the drawing), Y, and Z, thereby restricting movement of the projector assembly 22 to a portion of a spherical path and enabling adjustment of an image (picture) generated by the projector assembly on a screen of a projection television to a desired geometry. Once the desired picture geometry has been achieved, the spherical bracket 16 is adapted be locked in place. Since the spherical engagement surfaces 14, 18 of the mounting system 10 are aimed at the virtual center P of the screen, rotations thereabout do not cause miscentering of the picture on the screen 24.

Figure 2:
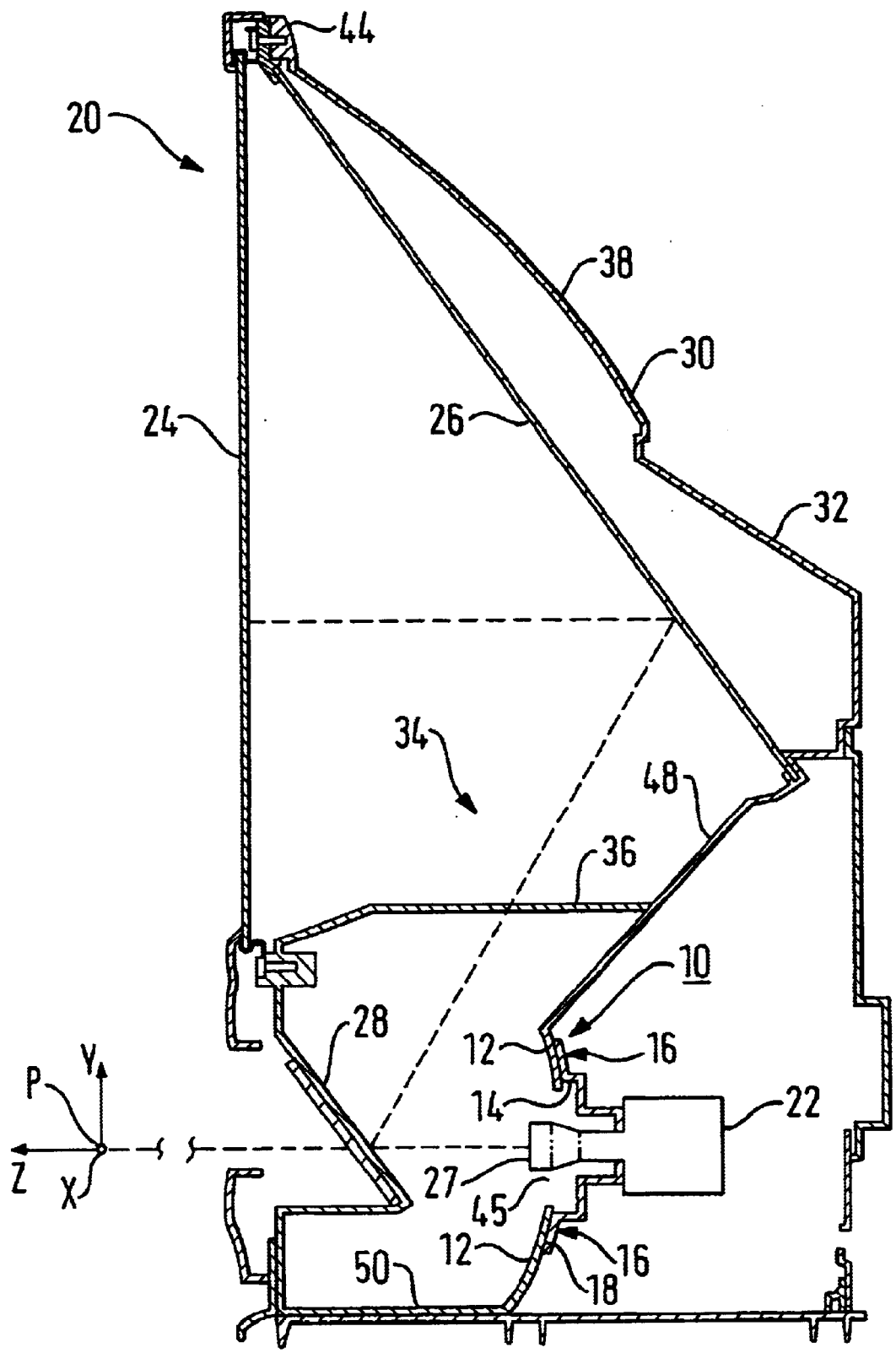
FIG. 2 is a cross-sectional side view of a projection TV employing the mounting system of the invention.
Figure 3:
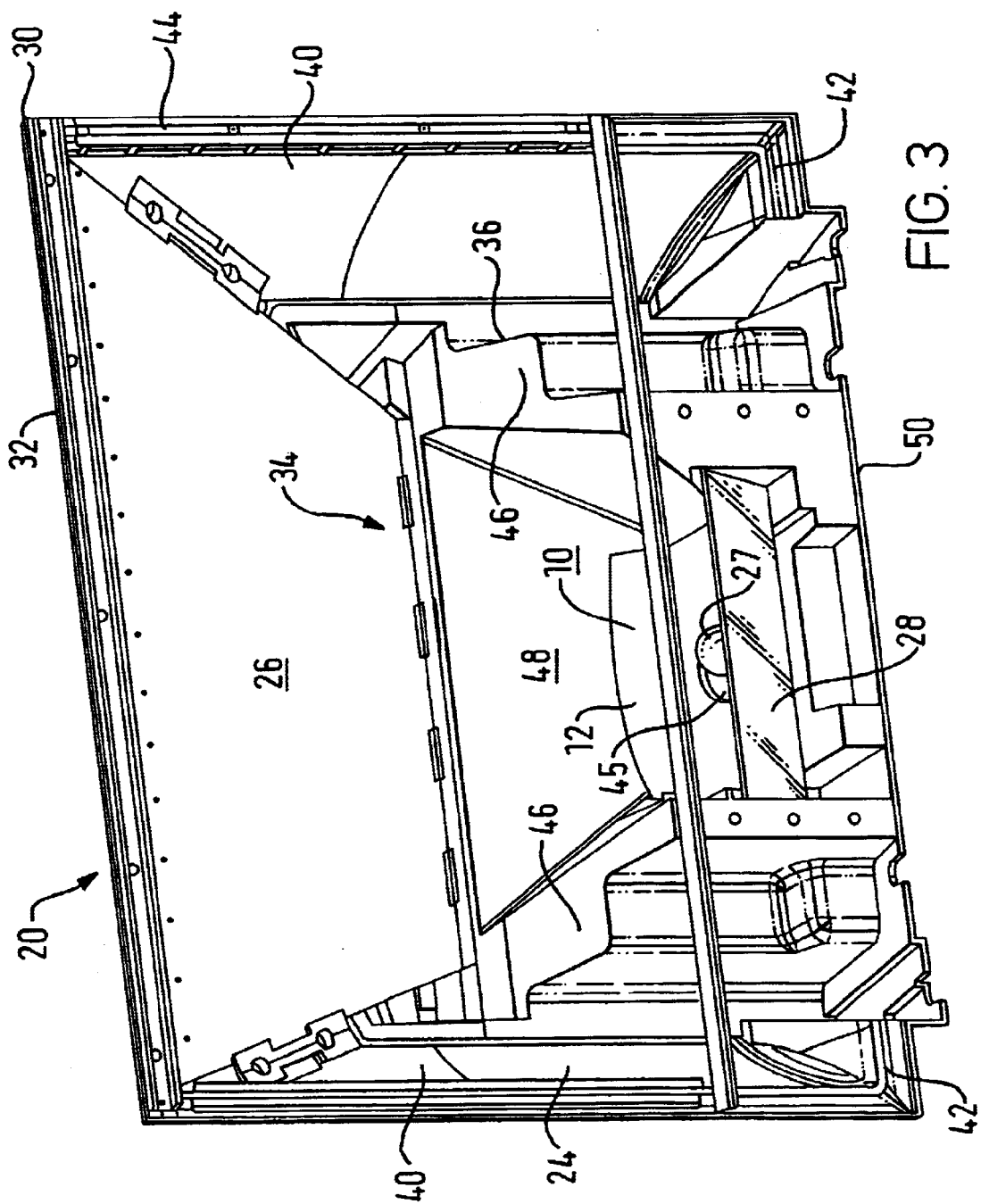
FIG. 3 is a perspective front view of the projection TV of FIG. 2.

As illustrated in FIGS. 2 and 3, the spherical wall 12 is preferably incorporated into a cabinet 30 that houses the light projector assembly 22, the screen 24 and the mirrors 26, 28, thus, only requiring the addition of the moveable bracket 16 to achieve the three axis rotation. The cabinet 30 comprises a self-supporting, one-piece, open-front enclosure 32 molded from a plastic material. The enclosure 32 is preferably made using a conventional gas injection molding process which minimizes internal stresses in the enclosure 32 and thus, dimensionally stabilizes the enclosure 32. The lower portion 34 of the enclosure 32 defines a frame section 36 that provides the enclosure 32 with rigidity. The frame section 36 is covered by an inclined top wall 38 and surrounded by a pair of side walls 40 with bottom edges 42 that turn inwardly toward the lower frame section 36. A flange 44 is molded with front edges of the top and side walls 38, 40.

The spherical wall 12 is preferably precision molded into the frame section 36. An aperture 45 in the spherical wall 12 permits the optics 27 of the light projector assembly 22 to extend there through. The spherical wall 12 is disposed laterally between a pair of spaced-apart, boxed frame members 46 and vertically between an angled upper wall 48 and horizontal bottom wall 50. The convex spherical surface 14 faces the rear of the cabinet 30.

Figure 4:
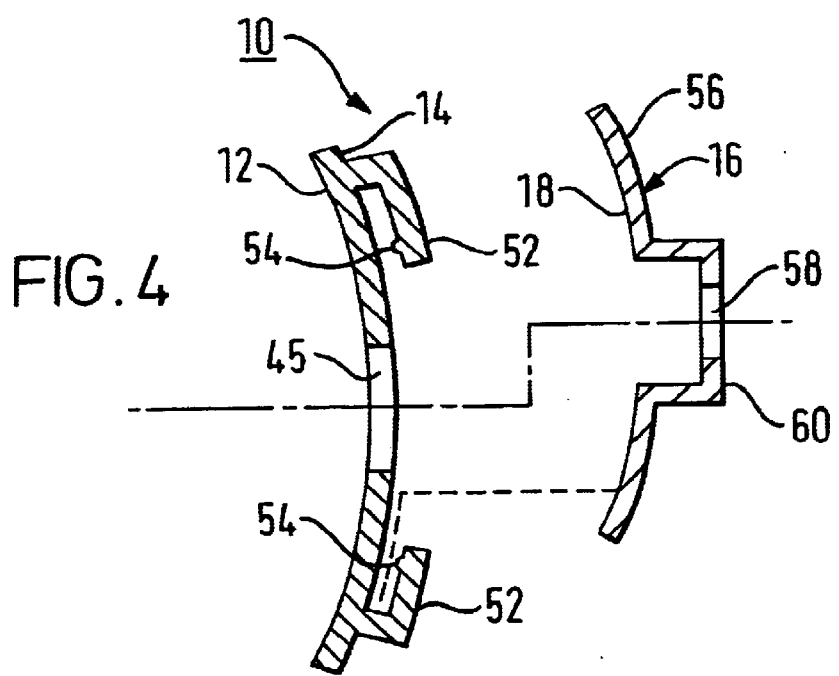
FIG. 4 is an exploded cross-sectional side view through the spherical mounting system of the invention.
Figure 5:
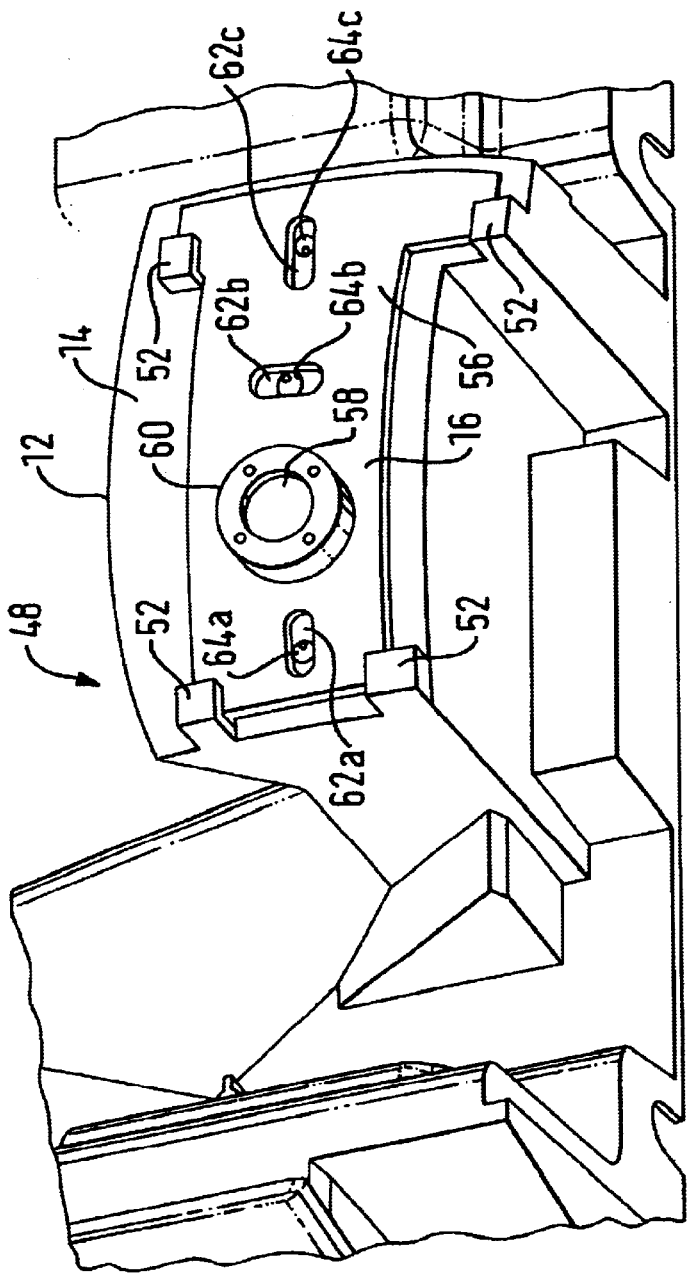
FIG. 5 is a perspective rear view of the projection TV of FIG. 2.
Figure 6:
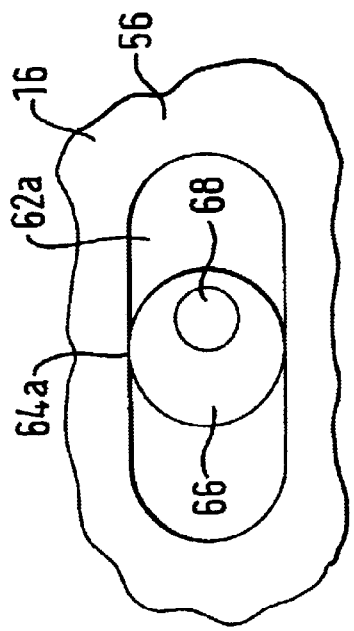
FIG. 6 is an enlarged section of the spherical bracket that illustrates one of the eccentrics used for finely adjusting the position of the spherical bracket relative to the spherical wall.

The spherical engagement surfaces 14, 18 of the spherical wall 12 and bracket 16 are maintained in intimate contact with one another by spring-type biasing means. The spring-type biasing means permit rotational movement of the spherical bracket 16 relative to the spherical wall 12 about the X, Y, and Z axes. As collectively illustrated in FIGS. 4 and 5, the spring biasing means preferably comprises L-shape spring fingers 52 extending rearwardly from the convex spherical engagement surface 14 of the spherical wall 12. The spring fingers 52 are molded in the corners of the spherical wall 12 (FIG. 5) and clamp the spherical bracket 16 to the spherical wall 12. The inner surfaces of the fingers 52 can include interference bumps 54 (FIG. 4) which concentrate the biasing force exerted by the fingers against the back surface 56 of the spherical bracket 16.

The spherical bracket 16 includes an aperture 58 encircled by a raised flange 60 extending from the back surface 56 that attaches the light projector assembly 22 to the spherical bracket 16. The aperture 56 of the spherical bracket 16 cooperates with the aperture 45 in the spherical wall 12 to permit the optics 27 of the light projector assembly 22 to extend through the mounting system 10 and face the angled lower mirror 28 so that images generated by the projector assembly 22 can be directed to the screen 24 as shown in FIG. 2.

The spherical mounting system 10 further includes means for finely adjusting the position of the spherical bracket 16 relative to the spherical wall 12. The position adjustment means include three eccentrics 64a, 64b, 64c that coact with three cam slots 62a, 62b, 62c formed in the spherical bracket, two of which are collinear (62a, 62c) and one that is perpendicular (62b). Each eccentric 64a, 64b, 64c includes an eccentric cam 66 with an off-center cylindrical cam drive member 68 extending from one surface thereof. The cam drive members 68 extend through corresponding cylindrical apertures (not shown) in the spherical wall 12. The cams 66 of the eccentrics 64a, 64b, 64c are seated in their respective cam slots 62a, 62b, 62c of the spherical bracket 16. The position of the spherical bracket 16 is finely adjusted relative to the spherical wall 12 by turning one or more of the eccentrics 64a, 64b, 64c.

By adjusting the position of the spherical bracket 16 relative to the spherical wall 12, one can rotate the light projector assembly 22 about the virtual center P (FIG. 1) to adjust the image or picture at the screen 24 to a desired geometry. More specifically, turning eccentrics 64A & 64C in concert with each other to lift one side and lower the other side of spherical bracket 16 rotates the light projector assembly 22 about the Z axis thereby providing true 1-to-1 rotation at the screen 24. Turning eccentric 64B rotates the light projector assembly 22 about the Y axis thereby providing "trapezoidal" adjustment at the screen 24. Turning eccentrics 64A & 64C in concert with each other to lift or lower spherical bracket 16 rotates the light projector assembly 22 about the X axis thereby providing "keystone" adjustment at the screen 24. Accordingly, the spherical mounting system enables the light projector assembly 22 to be rotationally adjusted to correct geometry errors in the image generated thereby, while maintaining the projector assembly's aim at the virtual center of the screen 24.

While the foregoing invention has been described with reference to the above embodiments, various modifications and changes can be made without departing from the spirit of the invention. Accordingly, all such modifications and changes are considered to be within the scope of the appended claims.

What is claimed is:

1. A mounting system for a light projector assembly of a projection television; the mounting system comprising:
    a spherical wall; and
    a spherical bracket;
    eccentrics for finely adjusting the location of the spherical bracket relative to the spherical wall;
    the spherical wall and bracket being able to coact with one another to restrict movement of the light projector assembly to a portion of a spherical path; and said eccentrics being able to coact with apertures and cam slots respectively formed in the spherical wall and bracket.

2. The mounting system according to claim 1, wherein the restricted movement of the light projector assembly enables geometry errors in the image generated thereby to be corrected to the desired geometry while maintaining the projector assembly's aim at a virtual center of the screen.

3. The mounting system according to claim 1, wherein the spherical wall includes a first spherical surface and the spherical bracket includes a second spherical surface which slidably engages the first spherical surface of the wall.

4. A mounting system for three axis rotational adjustment of a light projector assembly of a projection television, the mounting system comprising:
    a spherical wall; and
    a spherical bracket for attaching a light projector to the mounting system, the spherical bracket slidably engaged with the spherical wall and moveable relative thereto;
    wherein the spherical wall and bracket coact with one another to rotate the light projector assembly along three axes, thereby restricting movement of the projector assembly to a portion of a spherical path and enabling adjustment of an image generated by the projector assembly on a screen of a projection television to a desired geometry.

5. The mounting system according to claim 4, wherein the restricted movement of the light projector assembly to a portion of a spherical path enables geometry errors in the image generated thereby to be corrected to the desired geometry while maintaining the projector assembly's aim at a virtual center of the screen.

6. The mounting system according to claim 4, wherein the spherical wall includes a spherical surface.

7. The mounting system according to claim 4, wherein the spherical bracket includes a spherical surface.

8. The mounting system according to claim 4, wherein the spherical wall includes a spherical surface and the spherical bracket includes a spherical surface which slidably engages the spherical surface of the wall.

9. The mounting system according to claim 4, further comprising adjusting means for finely adjusting the position of the spherical bracket relative to the spherical wall.

10. The mounting system according to claim 9, wherein the adjusting means include eccentrics that coact with apertures and cam slots respectively formed in the spherical wall and bracket.

11. The mounting system according to claim 4, wherein the spherical wall is a member of a projection television cabinet of the projection television.

12. The mounting system according to claim 4, wherein the spherical bracket includes means for attaching the light projector assembly to the mounting system.

* * * * *